US012725911B2

(12) United States Patent
Tsai et al.

(10) Patent No.: US 12,725,911 B2
(45) Date of Patent: Sep. 1, 2026

(54) ANTENNA STRUCTURE WITH PERIODIC PATTERNS

(71) Applicants: ONEWAVE TECHNOLOGY CO., LTD., Taipei City (TW); Yun-Chan Tsai, Taipei City (TW)

(72) Inventors: Yun-Chan Tsai, Taipei City (TW); Shi-Yu Chiu, Taipei City (TW); Shi-Hong Yang, Taipei City (TW); Chin-Yun Hsu, Taipei City (TW); Chien-Ku Kuo, Taipei City (TW)

(73) Assignees: Yun-Chan Tsai, Taipei City (TW); ONEWAVE TECHNOLOGY CO., LTD., Taipei City (TW)

( * ) Notice: Subject to any disclaimer, the term of this patent is extended or adjusted under 35 U.S.C. 154(b) by 0 days.

(21) Appl. No.: 19/088,838

(22) Filed: Mar. 24, 2025

(65) Prior Publication Data

US 2026/0100498 A1 Apr. 9, 2026

(30) Foreign Application Priority Data

Oct. 8, 2024 (TW) ................................ 113210867

(51) Int. Cl.
*H01Q 1/22* (2006.01)
*H01Q 5/30* (2015.01)
*H01Q 5/50* (2015.01)

(52) U.S. Cl.
CPC ............. *H01Q 1/2283* (2013.01); *H01Q 5/30* (2015.01); *H01Q 5/50* (2015.01)

(58) Field of Classification Search
CPC .......... H01Q 1/22; H01Q 1/2283; H01Q 1/38; H01Q 1/48; H01Q 5/30; H01Q 5/371; H01Q 5/50; G06K 19/07773
See application file for complete search history.

(56) References Cited

U.S. PATENT DOCUMENTS 9,887,464 B2 * 2/2018 Park ......................... H01Q 1/36
11,515,648 B2 * 11/2022 Liao ..................... H01Q 1/2283
11,929,544 B2 * 3/2024 Kato ...................... H01Q 5/364

* cited by examiner

*Primary Examiner* — Hasan Islam
(74) *Attorney, Agent, or Firm* — Studebaker Brackett PLLC

(57) ABSTRACT

An antenna structure at least includes a chip antenna. The chip antenna includes: a carrier, a first radiating unit, a second radiating unit, and an electric conductor. The first radiating unit is repeatedly designed with two or more periodic pattern layers to increase the bandwidth of the chip antenna and reduce the frequency point of the chip antenna, thereby improving the performance of the antenna. The first radiating unit is arranged on a top surface of the carrier to control the high-frequency band impedance, resonant frequency, and radiation effect, and use two or more periodic pattern layers to generate the frequency multiplication of the low-frequency band and control the frequency offset of the high-frequency band. The second radiating unit on a bottom surface controls the low-frequency band to achieve the predetermined target impedance, resonant frequency, bandwidth, and radiation effect. The size of the antenna is effectively reduced.

12 Claims, 3 Drawing Sheets

ANTENNA STRUCTURE WITH PERIODIC PATTERNS

CROSS-REFERENCE TO RELATED APPLICATION

This application claims benefit of priority to Taiwanese Patent Application No. 113210867 filed Oct. 8, 2024, the entire contents of which are incorporated herein by reference.

BACKGROUND OF THE DISCLOSURE

Technical Field

The present disclosure relates to an antenna, and especially relates to a multi-band antenna structure with periodic patterns.

Description of Related Art

Current 3C electronic products, including desktop computers, notebook computers, TV game consoles, tablet computers, smartphones, and so on, are all developed and designed to be lightweight, thin, and compact, making it easier for users to carry them when going out. As 3C electronic products become thinner and lighter, the size of the antenna arranged inside 3C electronic products for transmitting and receiving wireless communication signals also needs to be reduced, or the antenna structure type should be changed so that the antenna structure may be arranged inside the electronic product.

Multi-frequency single-feed chip antennas are currently common on the market. During production, the ceramic material is first made into a square body, and a radiating pattern layer for signal emission or reception is formed on the surface of the square body through etching technology. After the chip antenna is electrically connected to the antenna substrate and arranged in the 3C electronic product, the chip antenna may transmit wireless communication signals.

Although the design of the direction or layout of the radiating lines of the radiating pattern layer on the surface of the chip antenna may provide wireless communication signal transmission, the radiating lines are not designed to have a mode of a periodic pattern layer for the direction or layout of the radiating lines. Therefore, the design of the chip antenna may not increase the bandwidth of the antenna or decrease the frequency point of the antenna, making it impossible to improve the performance of the chip antenna. At the same time, it also causes the size of the chip antenna and the antenna substrate to be unable to be reduced enough to be arranged on the thin, light, and short 3C electronic product.

Therefore, how to solve the design problems of the radiating lines on the surface of the traditional chip antenna so the chip antenna may increase the antenna bandwidth and reduce the frequency point of the antenna to improve the efficiency of the antenna, is the problem to be solved by the present disclosure.

SUMMARY OF THE INVENTION

The main object of the present disclosure is to solve the traditional shortcomings. The present disclosure uses two or more periodic pattern layers to repeatedly design the radiating lines on the surface of the chip antenna to increase the bandwidth of the chip antenna and reduce the frequency point of the chip antenna, thereby improving the efficiency of the antenna.

Another object of the present disclosure is to arrange the radiating units of the high-frequency band and the low-frequency band on the top surface and the bottom surface of the carrier respectively. The radiating unit on the top surface is used to control the high-frequency band impedance, resonance frequency, and radiation effect. Two or more periodic pattern layers are used to generate the frequency multiplication of the low-frequency band and control the frequency offset of the high-frequency band. The radiating unit on the bottom surface is used to control the low-frequency band to achieve the predetermined target impedance, resonant frequency, bandwidth, and radiation effect. The size of the antenna is effectively reduced.

In order to achieve the above object, the present disclosure provides an antenna structure which at least includes a chip antenna. The chip antenna includes: a carrier, a first radiating unit, a second radiating unit, and an electric conductor. The carrier is a square body with a top surface and a bottom surface. The first radiating unit is arranged on the top surface. The first radiating unit includes: two upper radiating layers, at least two periodic pattern layers, and a side radiating layer. The two upper radiating layers are respectively arranged at two ends of the top surface of the carrier. The at least two periodic pattern layers are symmetrical and electrically connected between the two upper radiating layers. The at least two periodic pattern layers are arranged on the top surface in a coupling relationship. Moreover, one side between the two upper radiating layers and the at least two periodic pattern layers is electrically connected to the side radiating layer. The second radiating unit is arranged on the bottom surface. The second radiating unit includes: a first lower radiating layer and a second lower radiating layer. The electric conductor is arranged inside the carrier and is through the carrier. One end of the electric conductor is electrically connected to the two upper radiating layers. The other end of the electric conductor is electrically connected to the first lower radiating layer and the second lower radiating layer.

In an embodiment of the present disclosure, each of the at least two periodic pattern layers includes: a first radiating line, a second radiating line, and a third radiating line.

In an embodiment of the present disclosure, the first radiating line and the second radiating line are both S-shaped, and are parallel to each other, and are arranged on the top surface of the carrier.

In an embodiment of the present disclosure, the third radiating line is U-shaped and includes a U-shaped part, a left line segment, and a right line segment. The U-shaped part is located between the first radiating line and the second radiating line. A left side and a right side of the U-shaped part respectively extend with the left line segment and the right line segment. The left line segment and the right line segment are straight-line-shaped. The left line segment and the right line segment are perpendicular to (and electrically connected to) a first S-shaped bent part of the first radiating line and a second S-shaped bent part of the second radiating line respectively. The left line segment, the right line segment, the first S-shaped bent part, and the second S-shaped bent part are arranged on the top surface of the carrier.

In an embodiment of the present disclosure, the side radiating layer is a continuous square wave pattern.

In an embodiment of the present disclosure, an area of the second lower radiating layer is greater than an area of the first lower radiating layer.

In an embodiment of the present disclosure, the electric conductor includes a plurality of electric conductive pillars. The electric conductive pillars are buried in (and are through) the carrier. One end of the electric conductive pillars is electrically connected to the two upper radiating layers. The other end of the electric conductive pillars is electrically connected to the first lower radiating layer and the second lower radiating layer.

In an embodiment of the present disclosure, the carrier is made of a fiberglass material or a ceramic material.

In an embodiment of the present disclosure, the antenna structure further includes an antenna substrate, a first ground layer, a bare part, an electrode terminal, and a signal feed line. The chip antenna is electrically connected to the antenna substrate with a clearance area. The first ground layer and the bare part are arranged on a front surface of the antenna substrate. The electrode terminal and the signal feed line are arranged on the bare part. The first lower radiating layer and the second lower radiating layer of the second radiating unit are electrically connected to the electrode terminal and one end of the signal feed line respectively.

In an embodiment of the present disclosure, the signal feed line includes a first signal feed line, a second signal feed line, and a first spacing which is located between the first signal feed line and the second signal feed line. A second spacing is located between the first signal feed line and the second signal feed line and the first ground layer.

In an embodiment of the present disclosure, the antenna structure further includes a matching component electrically connected between the first spacing and the second spacing to perform an impedance and frequency adjustment.

In an embodiment of the present disclosure, the antenna structure further includes a second ground layer and a back clearance area which are arranged on a back surface of the antenna substrate.

DETAILED DESCRIPTION

The technical content and the detailed description of the present disclosure are now explained with the drawings as follows.

Figure 1:
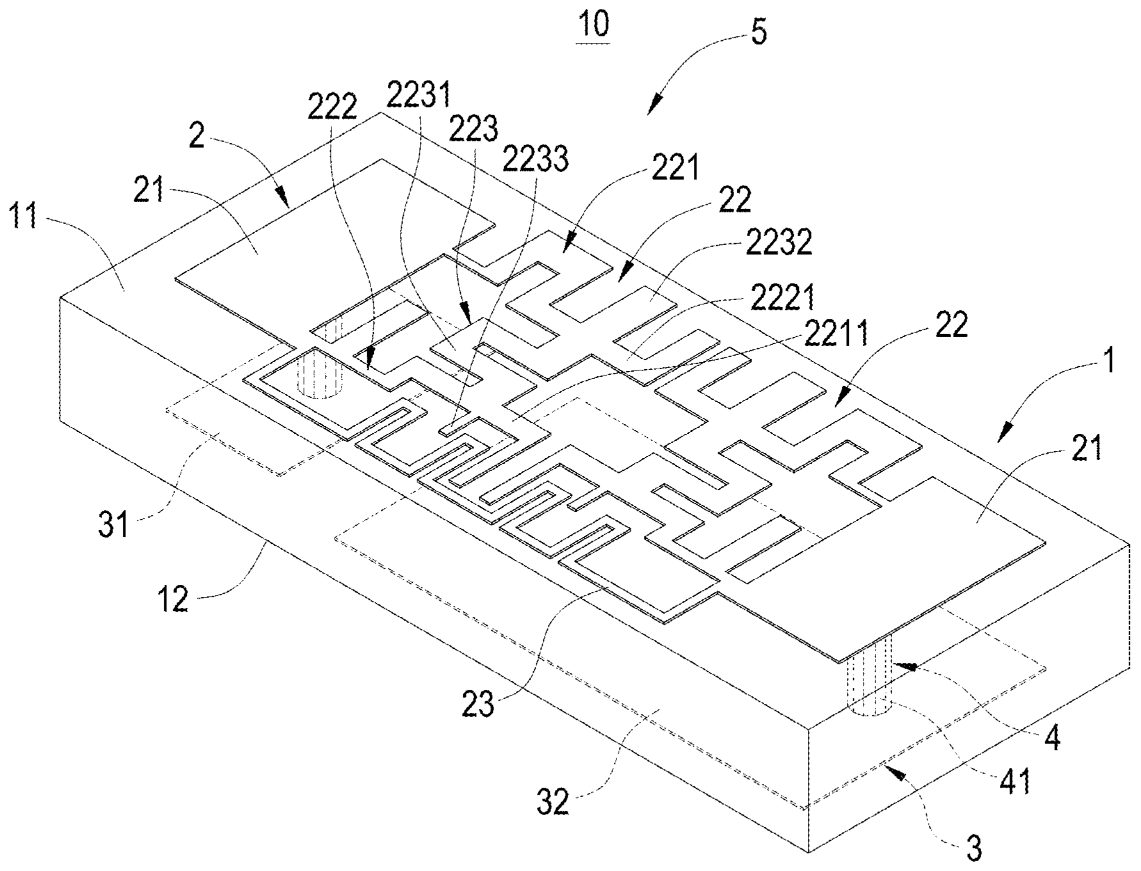
FIG. 1 shows a three-dimensional schematic diagram of the structure appearance of the chip antenna of the present disclosure.
Figure 2:
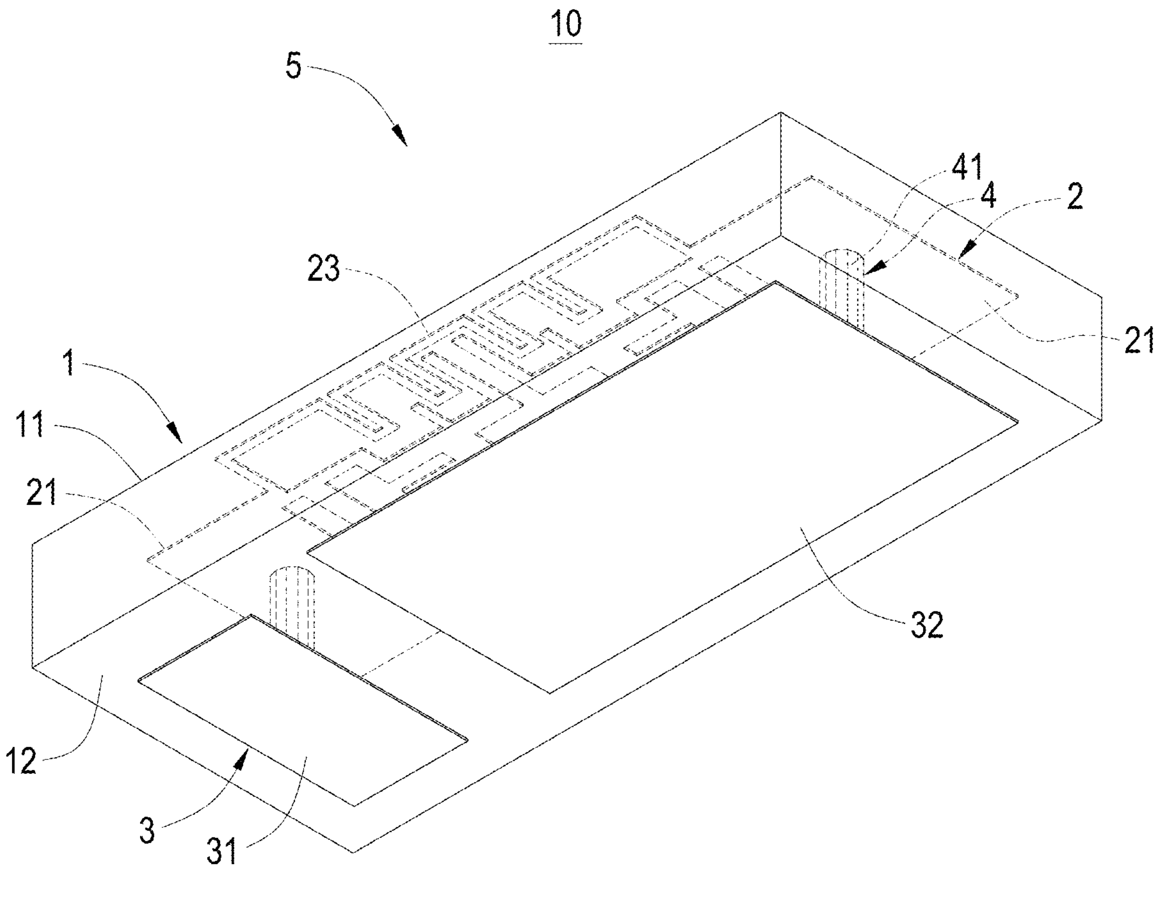
FIG. 2 shows a three-dimensional schematic diagram of the appearance of the other side of FIG. 1.

FIG. 1 shows a three-dimensional schematic diagram of the structure appearance of the chip antenna of the present disclosure. FIG. 2 shows a three-dimensional schematic diagram of the appearance of the other side of FIG. 1. As shown in FIG. 1 and FIG. 2, an antenna structure 5 of the present disclosure at least includes a chip antenna 10. The chip antenna 10 includes: a carrier 1, a first radiating unit 2, a second radiating unit 3, and an electric conductor 4.

The carrier 1 is a square body with a top surface 11 and a bottom surface 12. In FIG. 1 and FIG. 2, the carrier 1 is made of a fiberglass material or a ceramic material.

The first radiating unit 2 is arranged on the top surface 11 of the carrier 1. The first radiating unit 2 includes: two upper radiating layers 21, at least two periodic pattern layers 22, and a side radiating layer 23. The two upper radiating layers 21 are respectively arranged at two ends of the top surface 11 of the carrier 1. The at least two periodic pattern layers 22 are symmetrical and electrically connected between the two upper radiating layers 21. The at least two periodic pattern layers 22 have two or more identical line/circuit pattern arrangement arranged on the top surface 11 of the carrier 1 with a coupling effect to form one of the radiating units of the chip antenna 10. Each of the at least two periodic pattern layers 22 includes: a first radiating line 221, a second radiating line 222, and a third radiating line 223. The first radiating line 221 and the second radiating line 222 are both S-shaped, and are parallel to each other, and are arranged on the top surface 11 of the carrier 1. The third radiating line 223 is U-shaped and includes a U-shaped part 2231, a left line segment 2232, and a right line segment 2233. The U-shaped part 2231 is located between the first radiating line 221 and the second radiating line 222. A left side and a right side of the U-shaped part 2231 respectively extend with the left line segment 2232 and the right line segment 2233. The left line segment 2232 and the right line segment 2233 are straight-line-shaped. The left line segment 2232 and the right line segment 2233 are perpendicular to (and electrically connected to) a first S-shaped bent part 2211 of the first radiating line 221 and a second S-shaped bent part 2221 of the second radiating line 222 respectively. The left line segment 2232, the right line segment 2233, the first S-shaped bent part 2211, and the second S-shaped bent part 2221 are arranged on the top surface 11 of the carrier 1. Moreover, one side between the two upper radiating layers 21 and the at least two periodic pattern layers 22 is electrically connected to the side radiating layer 23. The side radiating layer 23 is a continuous square wave pattern.

It is worth mentioning that the design of the at least two periodic pattern layers 22 of the chip antenna 10 is repeated with two or more periodic pattern layers 22 on the carrier 1 of the chip antenna 10; the advantage is to increase the bandwidth of the chip antenna 10 and reduce the frequency point of the chip antenna 10, thereby improving the performance.

The second radiating unit 3 is arranged on the bottom surface 12 of the carrier 1. The second radiating unit 3 includes: a first lower radiating layer 31 and a second lower radiating layer 32. The first lower radiating layer 31 and the second lower radiating layer 32 are both rectangular bodies. Moreover, an area of the second lower radiating layer 32 is greater than an area of the first lower radiating layer 31.

What is more worth mentioning is that the design of the 2.4 GHz low-frequency path of a second radiating unit 3 is added to the bottom surface 12 of the chip antenna 10 to generate a dual-band of a first frequency band (which is 2.4 GHz) and a second frequency band (which is 5 GHz), or a third frequency band (6 GHz-7 GHz).

The electric conductor 4 includes a plurality of electric conductive pillars 41. The electric conductive pillars 41 are buried in (and are through) the carrier 1, so that one end of the electric conductive pillars 41 is electrically connected to the two upper radiating layers 21, and the other end of the electric conductive pillars 41 is electrically connected to the first lower radiating layer 31 and the second lower radiating layer 32.

By repeatedly designing the structure of the chip antenna 10 mentioned above with two or more periodic pattern layers 22 to increase the bandwidth of the chip antenna 10 and reduce the frequency point of the antenna (wherein reducing the frequency point means that it needs to be reduced in this way when the frequency of the chip antenna 10 itself is not low enough to meet the required frequency band), the performance is improved. The design of the low-frequency path of the second radiating unit 3 produces a dual-band or a three-band.

Moreover, two radiating units, namely the first radiating unit (high-frequency band) 2 and the second radiating unit (low-frequency band) 3, are arranged on the top surface 11 and the bottom surface 12 of the carrier 1 respectively, so that the first radiating unit 2 controls the high-frequency band impedance, resonance frequency, and radiation effect, and uses the structure of two or more periodic pattern layers 22 to generate the frequency multiplication of the low-frequency band and control the frequency offset of the high-frequency band; the second radiating unit 3 controls the low-frequency band to achieve the predetermined target impedance, resonance frequency, bandwidth, and radiation effect. The size of the antenna is effectively reduced.

Figure 3:
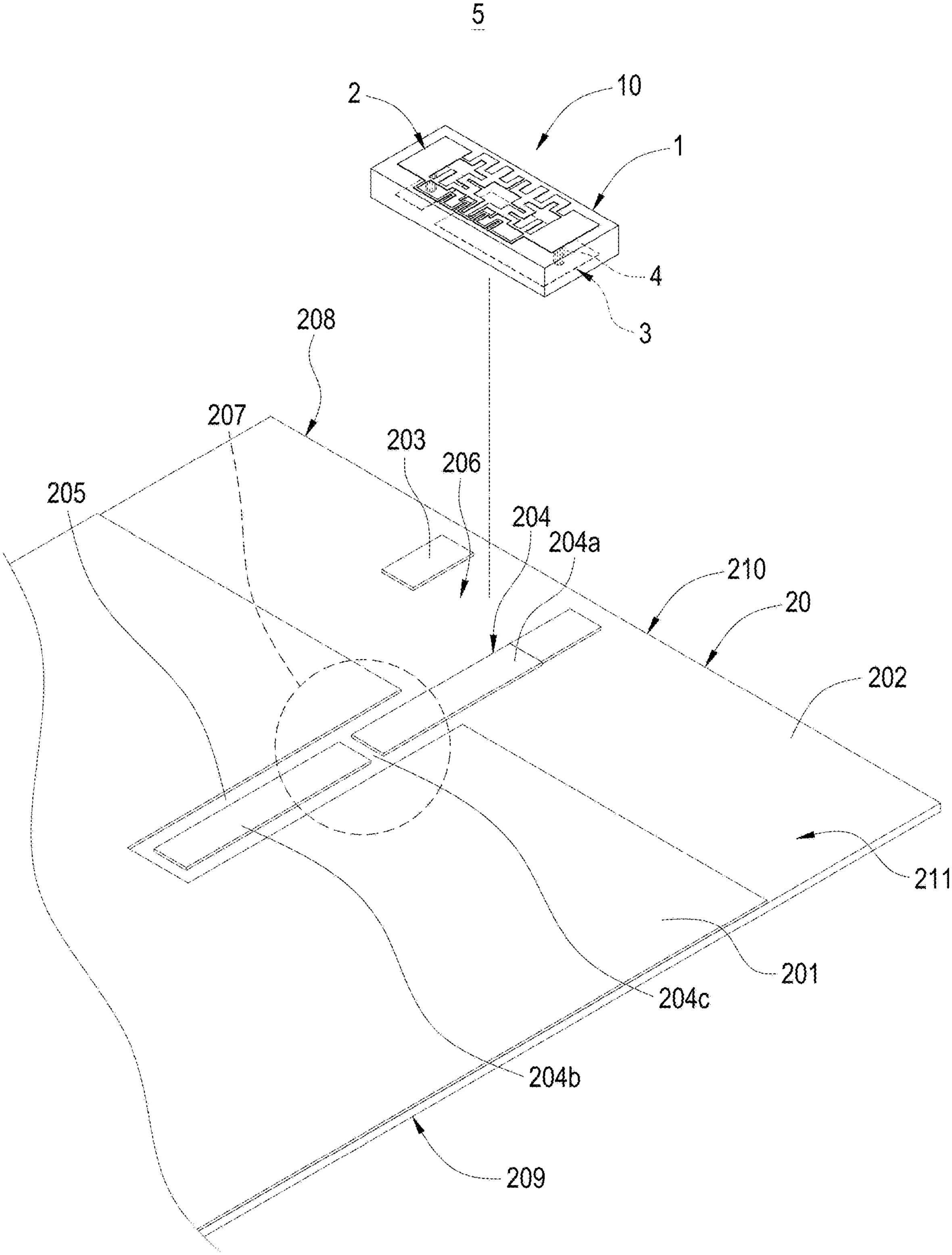
FIG. 3 shows a schematic diagram of the electrical connection between the chip antenna and the antenna substrate of the present disclosure.

FIG. 3 shows a schematic diagram of the electrical connection between the chip antenna and the antenna substrate of the present disclosure. At the same time, please refer to FIG. 1 and FIG. 2. As shown in the drawings, the present disclosure describes that the antenna structure 5 further includes an antenna substrate 20, a first ground layer 201, a bare part 202, an electrode terminal 203, a signal feed line 204, a matching component 207, a second ground layer 209, and a back clearance area 210. The chip antenna 10 is electrically connected to the antenna substrate 20. The chip antenna 10 is electrically connected to the antenna substrate 20 which includes a clearance area 206.

The first ground layer 201 and the bare part 202 are arranged on a front surface 211 of the antenna substrate 20. The electrode terminal 203 and the signal feed line 204 are arranged on the bare part 202. The first lower radiating layer 31 and the second lower radiating layer 32 of the second radiating unit 3 of the chip antenna 10 are electrically connected to the electrode terminal 203 and one end of the signal feed line 204 respectively.

The signal feed line 204 includes a first signal feed line **204*a*, a second signal feed line 204*b*, and a first spacing 204*c* which is located between the first signal feed line 204*a* and the second signal feed line 204*b*. A second spacing 205 is located between the first signal feed line 204*a* and the second signal feed line 204*b* and the first ground layer 201. The matching component 207 is electrically connected to the first signal feed line 204*a*, the second signal feed line 204*b*, and the first ground layer 201 through/across the first spacing 204*c* and the second spacing 205 to perform an impedance and frequency adjustment. Moreover, the second ground layer 209 and the back clearance area 210 are arranged on a back surface 208 of the antenna substrate 20. In FIG. 3, the matching component 207** is a capacitor or an inductor.

The above are only preferred embodiments of the present disclosure and are not intended to limit the scope of implementation of the present disclosure. Namely, all equal changes and modifications made based on the claim scope of the present disclosure are covered by the claim scope of the present disclosure.

What is claimed is:

1. An antenna structure, at least comprising a chip antenna, wherein the chip antenna comprises:

a carrier, being a square body with a top surface and a bottom surface;

a first radiating unit, arranged on the top surface of the carrier, wherein the first radiating unit comprises: two upper radiating layers, at least two periodic pattern layers, and a side radiating layer; the two upper radiating layers are respectively arranged at two ends of the top surface; the at least two periodic pattern layers are symmetrical and electrically connected between the two upper radiating layers; the at least two periodic pattern layers are arranged on the top surface in a coupling relationship; one side between the two upper radiating layers and the at least two periodic pattern layers is electrically connected to the side radiating layer;

a second radiating unit, arranged on the bottom surface of the carrier, wherein the second radiating unit comprises: a first lower radiating layer and a second lower radiating layer; and an electric conductor, arranged inside the carrier and through the carrier, one end of the electric conductor electrically connected to the two upper radiating layers, the other end of the electric conductor electrically connected to the first lower radiating layer and the second lower radiating layer.

2. The antenna structure of the claim 1, wherein each of the at least two periodic pattern layers includes: a first radiating line, a second radiating line, and a third radiating line.

3. The antenna structure of the claim 2, wherein the first radiating line and the second radiating line are both S-shaped, and are parallel to each other, and are arranged on the top surface of the carrier.

4. The antenna structure of the claim 3, wherein the third radiating line is U-shaped and comprises a U-shaped part, a left line segment, and a right line segment; the U-shaped part is located between the first radiating line and the second radiating line; a left side and a right side of the U-shaped part respectively extend with the left line segment and the right line segment; the left line segment and the right line segment are straight-line-shaped; the left line segment and the right line segment are perpendicular to and electrically connected to a first S-shaped bent part of the first radiating line and a second S-shaped bent part of the second radiating line respectively; the left line segment, the right line segment, the first S-shaped bent part, and the second S-shaped bent part are arranged on the top surface of the carrier.

5. The antenna structure of the claim 1, wherein the side radiating layer is a continuous square wave pattern.

6. The antenna structure of the claim 1, wherein an area of the second lower radiating layer is greater than an area of the first lower radiating layer.

7. The antenna structure of the claim 1, wherein the electric conductor comprises a plurality of electric conductive pillars; the electric conductive pillars are buried in and through the carrier; one end of the electric conductive pillars is electrically connected to the two upper radiating layers; the other end of the electric conductive pillars is electrically connected to the first lower radiating layer and the second lower radiating layer.

8. The antenna structure of the claim 1, wherein the carrier is made of a fiberglass material or a ceramic material.

9. The antenna structure of the claim 1, further comprising an antenna substrate, a first ground layer, a bare part, an electrode terminal, and a signal feed line, wherein the chip antenna is electrically connected to the antenna substrate with a clearance area; the first ground layer and the bare part are arranged on a front surface of the antenna substrate; the electrode terminal and the signal feed line are arranged on the bare part; the first lower radiating layer and the second lower radiating layer of the second radiating unit are electrically connected to the electrode terminal and one end of the signal feed line respectively.

10. The antenna structure of the claim 9, wherein the signal feed line comprises a first signal feed line, a second signal feed line, and a first spacing between the first signal feed line and the second signal feed line; a second spacing is located between the first signal feed line and the second signal feed line and the first ground layer.

11. The antenna structure of the claim 10, further comprising a matching component electrically connected between the first spacing and the second spacing to perform an impedance and frequency adjustment.

12. The antenna structure of the claim 10, further comprising a second ground layer and a back clearance area arranged on a back surface of the antenna substrate.

* * * * *